US008181795B2

(12) United States Patent
Tamai et al.

(10) Patent No.: US 8,181,795 B2
(45) Date of Patent: May 22, 2012

(54) POLYMER MEMBRANE FOR WATER TREATMENT

(75) Inventors: Toshihiro Tamai, Kyoto (JP); Saki Tanimura, Kyoto (JP); Naotaka Oyabu, Kyoto (JP); Ryuichi Matsuo, Kyoto (JP); Takashi Osugi, Kyoto (JP); Yuki Goto, Shunan (JP); Tadashi Okamoto, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/382,204

(22) PCT Filed: Jul. 5, 2010

(86) PCT No.: PCT/JP2010/061380
§ 371 (c)(1),
(2), (4) Date: Jan. 4, 2012

(87) PCT Pub. No.: WO2011/004786
PCT Pub. Date: Jan. 13, 2011

(65) Prior Publication Data
US 2012/0097605 A1 Apr. 26, 2012

(30) Foreign Application Priority Data

Jul. 6, 2009 (JP) ................................. 2009-159906

(51) Int. Cl.
*B01D 63/02* (2006.01)
*B01D 71/30* (2006.01)
*B01D 63/00* (2006.01)
(52) U.S. Cl. ............... 210/500.42; 210/500.23; 210/650
(58) Field of Classification Search .................. None
See application file for complete search history.

(56) References Cited

U.S. PATENT DOCUMENTS

| 4,039,440 | A | * | 8/1977 | Cadotte ........................ 210/654 |
| 4,377,481 | A | * | 3/1983 | Jakabhazy ............... 210/500.35 |
| 4,756,835 | A | * | 7/1988 | Wilson .......................... 210/651 |
| 5,318,417 | A | | 6/1994 | Kopp et al. |
| 5,378,369 | A | * | 1/1995 | Rose et al. .................... 210/637 |
| 7,435,348 | B2 | | 10/2008 | Chen |
| 7,862,718 | B2 | | 1/2011 | Doyen et al. |
| 2003/0116498 | A1 | * | 6/2003 | Mickols ........................ 210/483 |
| 2010/0108599 | A1 | * | 5/2010 | Vizvardi et al. .......... 210/500.23 |

FOREIGN PATENT DOCUMENTS

| JP | 62-87204 | 4/1987 |
| JP | 62-273006 | 11/1987 |
| JP | 3-502180 | 5/1991 |
| JP | 4-222807 | 8/1992 |
| JP | 8-108053 | 4/1996 |
| JP | 2001-151815 | 6/2001 |
| JP | 2003-147629 | 5/2003 |
| JP | 2008-508996 | 3/2006 |
| JP | 2007-500591 | 1/2007 |
| WO | 2006/015461 | 2/2006 |

OTHER PUBLICATIONS

International Search Report issued Aug. 17, 2010 in International (PCT) Application No. PCT/JP2010/061380.

* cited by examiner

*Primary Examiner* — Krishnan S Menon
(74) *Attorney, Agent, or Firm* — Wenderoth, Lind & Ponack, L.L.P.

(57) ABSTRACT

A polymer membrane for water treatment contained a chlorinated vinyl chloride resin with a chlorine content of 58 to 73.2%. According to the present invention, it is possible to provide polymer membranes for water treatment that, along with being able to achieve sufficient filtration capacity and water permeability, have extremely high strength.

15 Claims, No Drawings

POLYMER MEMBRANE FOR WATER TREATMENT

This application is a U.S. national stage of International Application No. PCT/JP2010/061380 filed Jul. 5, 2010.

TECHNICAL FIELD

The present invention relates to a polymer membrane for water treatment, and more specifically to a polymer membrane for water treatment suitable for use in a water treatment unit.

BACKGROUND ART

The separation membranes used in water treatment units are polymer membranes for water treatment with the objective of purifying water (for example, removing turbidity from river water and groundwater, clarification of industrial water, and for the treatment of wastewater and sewage). Various types of polymers are used in the constitution of polymer membranes for water treatment. For example, various polymeric materials such as polysulfones (PS), polyvinylidene fluoride (PVDF), polyethylene (PE), cellulose acetate (CA), polyacrylonitrile (PAN), and the like are used for separation membranes in polymer membranes for water treatment.

Meanwhile, as the morphology of a separation membrane used in water treatment units, porous hollow fiber membranes are used.

Examples of the properties that are required in a polymer membrane for water treatment, in addition to the goal of separation properties, include having superior water permeability and superior physical strength, high stability toward a variety of chemical substances (namely, chemical resistance), superior hot water resistance, and the like.

For example, cellulose acetate separation membranes are known not to become contaminated even over long-term use, with relatively high water permeability (for example, Patent Document 1).

However, its mechanical strength is low, and furthermore its chemical stability is inadequate. Consequently, when the separation membrane becomes contaminated, cleaning using physical or chemical means such as chemical products are extremely problematic.

Moreover, hollow fiber membranes made from poly(vinylidene fluoride) resin have been proposed as polymer membranes for water treatment having both superior physical strength and chemical resistance (for example, Patent Document 2).

However, poly(vinylidene fluoride) separation membranes tend to become contaminated progressively more readily with use.

Furthermore, hollow fibers made of vinyl chloride resin (for example, see Patent Document 3) have been proposed as separation membranes that can accomplish highly versatile water treatment methods.

However, polymer membranes for water treatment decrease the pure water permeability when a capacity for removing relatively small impurities (i.e., a filtration capacity) increases to the so-called ultrafiltration level. Conversely, when the pure water permeability is increased, the filtration capacity is relatively lower compared to an ultrafiltration membrane and reaches the level of a microfiltration membrane. In this way, there is a trade-off relationship between the filtration capacity and the pure water permeability, so that there is the problem with large scale facility that are required to maintain both a high filtration capacity and sufficient water permeability.

In addition, the polymer membranes for water treatment manufactured from vinyl chloride resins, polyethylene or the like have problems that are inferior to other resins in terms of strength, and furthermore that substantially decrease the water permeability due to thermal deformation under high temperature conditions.

PRIOR ART LITERATURE

Patent Literature

Patent Document 1: Japanese Published Unexamined Patent Application No. H08-108053 (1996)
Patent Document 2: Japanese Published Unexamined Patent Application No. 2003-147629
Patent Document 3: International Publication No. 2007-500591

SUMMARY OF THE INVENTION

Problem to be Solved by the Invention

The present invention is intended to solve the abovementioned problem with the goal of providing a polymer membrane for water treatment, while realizing both sufficient filtration capacity and water permeability, that has high strength and that has quality to last long under a broad range of operating conditions, in particular, under high-temperature conditions.

Means to Solve the Problem

A polymer membrane for water treatment of the present invention is characterized by containing a chlorinated vinyl chloride resin with a chlorine content of 58 to 73.2%.

In such polymer membrane for water treatment, the degree of polymerization for the chlorinated vinyl chloride resin is preferably 250 to 3000.

The chlorinated vinyl chloride resin is contained preferably 30 to 100 wt % based on all of the resin components that constitute the polymer membrane for water treatment.

A chlorinated vinyl chloride monomer unit that constitutes the main chain is preferably contained 30 to 100 wt % based on all of the monomer units that constitute the main chain.

A porous membrane and/or hollow fiber is preferred.

A membrane with a monolayer structure is preferred.

Effect of the Invention

According to the present invention, it is possible to provide polymer membranes for water treatment that, along with being able to achieve sufficient filtration capacity and water permeability, have extremely high strength.

MODES FOR IMPLEMENTING THE INVENTION

A polymer membrane for water treatment of the present invention contains chlorinated vinyl chloride resins.

Such chlorinated vinyl chloride resins can be polymers made from vinyl chloride monomer units that have been chlorinated, or can be chlorinated after polymerization of the vinyl chloride monomer. In addition, a chlorine content of 58 to 73.2% in the chlorinated vinyl chloride resin is satisfactory, 60 to 73.2% is preferred, and 67 to 71% is further preferred. If the chlorine content is too low, sufficient heat stability and durability cannot be obtained, while if it gets too high, not only do problems with moldability and processability tend to arise, but there are problems in manufacturing the resin due to steric repulsions between neighboring chlorines. Consequently, by increasing the chlorine content in this way, the polarity of the resin increases, and the solubility in polar solvents used for the film casting solution can be increased, while facilitating solvent exchange in the coagulation tank. This results in the occurrence of instantaneous phase separation, so that it is possible to increase the strength of the membrane due to the ready formation of a sponge-like dense layer.

Examples of vinyl chloride resins include vinyl chloride homopolymers, copolymers of vinyl chloride monomers with monomers having copolymerizable unsaturated bonds, copolymers with vinyl chloride monomer (preferably containing 50 wt % or more of units derived from vinyl chloride monomer), and graft copolymers with the grafting of vinyl chloride monomers onto polymers. These can be used singly, or 2 or more types can be combined for use.

Examples of monomers that have an unsaturated bond and are copolymerizable with vinyl chloride monomer include α-olefins such as ethylene, propylene, butylene, and the like;

vinyl esters such as vinyl acetate, vinyl propionate, and the like;

vinyl ethers such as butyl vinyl ether, cetyl vinyl ether, and the like;

(meth)acrylate esters such as methyl (meth)acrylate, ethyl (meth)acrylate, butyl acrylate, phenyl methacrylate, and the like;

aromatic vinyl compounds such as styrene, α-methylstyrene, and the like;

vinyl halides such as vinylidene chloride, vinylidene fluoride, and the like;

N-substituted maleimides such as N-phenylmaleimide, N-cyclohexylmaleimide, and the like; (meth)acrylic acid, maleic anhydride, acrylonitrile, and the like. These can be used singly, or 2 or more types can be combined for use.

Examples of polymers that can be graft-polymerized with vinyl chloride, although not limited to the graft polymerization of vinyl chloride, include ethylene/vinyl acetate copolymers, ethylene/vinyl acetate/carbon monoxide copolymers, ethylene/ethyl acrylate copolymers, ethylene/butyl acetate/carbon monoxide copolymers, ethylene/methyl methacrylate copolymers, ethylene/propylene copolymers, acrylonitrile/butadiene copolymers, polyurethanes, chlorinated polyethylene, chlorinated polypropylene, and the like. These can be used singly, or 2 or more types can be combined for use.

Without being limiting in any particular way, any desired conventionally-known polymerization method can be employed as the above-mentioned method for manufacturing vinyl chloride resins. Examples thereof include bulk polymerization, solution polymerization, emulsion polymerization, suspension polymerization, and the like.

Without being limiting in any particular way, chlorination methods that can be used include methods that are well known in the art, such as are described in Japanese Published Unexamined Patent Application No. H09-278826, Japanese Published Unexamined Patent Application No. 2006-328165, World Patent WO/2008/62526, and the like.

Concrete examples include methods that promote chlorination by exciting the vinyl chloride resin bonds and the chlorine by heating (referred to below as thermal chlorination), methods that promote chlorination via photochemical reactions by irradiating with light (referred to below as photochlorination), and methods that involve photoirradiation while heating.

Thermal chlorination is preferred from the perspective that it can give more uniform chlorination, and the chlorinated vinyl chloride resin obtained has increased thermal stability. In addition, it is possible to reduce the low-glass-transition temperature component contained in the vinyl chloride resin by employing thermal chlorination. Consequently, pore blockages can be kept to a minimum when the polymer membrane for water treatment obtained is used at high temperatures.

Particular thermal chlorination methods include thermal chlorination of an aqueous suspension.

For example, pure water and vinyl chloride monomer or vinyl chloride resin are introduced into a reaction vessel equipped with a stirrer and a jacket, after which the air inside the reaction vessel is evacuated using a vacuum pump, and the contents of the reaction vessel are heated by the jacket with stirring. After reaching a predetermined temperature, chlorination of the vinyl chloride resin can be conducted by introducing chlorine into the reaction vessel.

Without being limiting in any particular way, so that the material of the reaction vessel for thermal chlorination of an aqueous suspension is resistant to corrosion by chlorine and hydrogen chloride, it is preferable to employ corrosion countermeasures such as the use of a glass lining.

The reaction temperature for thermal chlorination of an aqueous suspension is preferably 70 to 130° C. If the temperature is too low, the chlorination reaction tends to be extremely slow. If the temperature is too high, the resin tends to undergo thermal degradation and readily becomes discolored. A temperature of 90 to 120° C. is further preferred. Moreover, depending on the progress of the reaction, multi-stage temperature control can be done by changing the reaction temperature during the course of the reaction.

The higher the chlorine concentration in the reaction system, the more readily the chlorination reaction will proceed, so without being limiting in any particular way, the reaction vessel for the thermal chlorination of an aqueous suspension is preferably designed to withstand a reaction pressure at the high end of the permissible range.

Additionally, examples of methods to promote chlorination using a photochemical reaction include using ultraviolet radiation, or irradiation with visible light using a mercury lamp, arc lamp, incandescent lamp, fluorescent lamp, carbon arc lamp, or the like, while placing the chlorine in contact with a suspension of the vinyl chloride monomer or vinyl chloride resin, or the like.

Adjustment of the chlorine content can be done via corresponding adjustments in the abovementioned reaction conditions.

A degree of polymerization of about 250 to 3000 is satisfactory for the vinyl chloride resin used in the polymer membrane for water treatment of the present invention, and is preferably about 500 to 1500. A degree of polymerization that is too low will lower the solution viscosity during spinning, which tends to be problematic for the membrane manufacturing operations. On the other hand, a degree of polymerization that is too high will cause the viscosity to be too high and tends to result in residual bubbles in the water treatment membrane that has been manufactured. Here, the degree of polymerization means a measured value that complies with JIS K 6720-2.

To adjust the degree of polymerization to be within the abovementioned range, it is preferable to make suitable adjustments to conditions that are well known in the art, such as in reaction time, reaction temperature, and the like.

In this way, based on all of the resin components that make up the polymer membrane for water treatment, a chlorinated vinyl chloride resin with a specific chlorine content of about 30 to 100 wt % is satisfactory, while about 50 to 100 wt % is preferred and about 70 to 100 wt % are further preferred. Moreover, based on all of the monomers that constitute the main chain, including about 30 to 100 wt % of chlorinated vinyl chloride monomer that constitutes the main chain is satisfactory, about 50 to 100 wt % is preferred and about 70 to 100 wt % are further preferred.

By including chlorinated vinyl chloride resins with such ranges of chlorine content in the polymer membrane for water treatment, heat stability is increased, and decreases in mechanical strength and water permeability can be kept to a minimum, even when used at high temperatures.

In the polymer membrane for water treatment of the present invention, other resin components, that is other than the abovementioned chlorinated vinyl chloride resins with a particular chlorine content, such vinyl chloride homopolymers with a lower chlorine content; copolymers which is obtained from vinyl chloride and copolymerizable monomers, and has a lower chlorine content; resin components other than vinyl chloride resins; and the like, can all be used within the scope in which the effect of the present invention is not undermined. The use of such other resin components within the range of 0 to 70 wt % is satisfactory.

Specific examples of other resin components include vinyl chloride resins that contain vinyl chloride structures among the units constituting the main chain such as vinyl chloride/acrylic graft copolymers, vinyl chloride/vinyl acetate copolymers, vinyl chloride/vinyl acetate/polyvinyl alcohol copolymers, vinyl chloride/vinyl acetate/ethylene copolymers, vinyl chloride/vinyl acetate/maleic anhydride copolymers, and the like;

vinyl chloride resins described in Japanese Published Unexamined Patent Application No. 2005-36195, Japanese Published Unexamined Patent Application No. 2005-36196, and Japanese Published Unexamined Patent Application No. 2005-36216 by the same applicant, and formed by a method described therein and according thereto;

polysulfone resins, polyacrylonitrile resins, polyvinyl alcohol resins, polyimide resins, polyolefin resins, acrylic resins, polyvinylidene fluoride resins, and the like.

These can be used singly, or two or more types can be used in combination.

Without being limiting in any way, a satisfactory degree of polymerization for such other resin components is approximately the same as that for the chlorinated vinyl chloride resins.

Furthermore, without being limiting in any way, the chlorine content in the vinyl chloride resins mentioned above as other components can suitably be in the range of 58 to 73.2%, preferably 60 to 73.2%, and further preferably 67 to 71%.

With the objective of improving various properties such as moldability during membrane manufacture, heat stability, and the like, in the polymer membrane for water treatment of the present invention, lubricants, heat-stabilizing agents, membrane-forming aids, and the like can be blended in.

Examples of lubricants include stearic acid, paraffin wax, and the like.

Examples of heat stabilizing agents include such as tin, lead, and Ca/Zn stabilizing agents, and the like that are used, in general, in molding the vinyl chloride resins, specifically organotin mercaptides, metallic soaps, and the like.

Examples of membrane-forming aids include hydrophilic polymers and the like such as polyethylene glycol, polyvinylpyrrolidone, and the like, with various degrees of polymerization, or inorganic salts and the like.

Polymer membranes for water treatment of the present invention can be manufactured by methods well known to the art. For example, the thermally-induced phase separation method, non-solvent phase separation method, drawing method, and combinations of these methods. Among these, from the perspectives of both high water permeability and fractionation performance, manufacture using the non-solvent phase separation method is preferred. In particular, membranes formed using the non-solvent phase separation method can be molded into dense layers having a suitably small pore structure.

Examples of solvents that can be used in manufacture with wet methods (dry and wet methods) such as the thermally-induced phase separation method and non-solvent phase separation method include dimethylformamide (DMF), dimethylacetamide (DMAc), tetrahydrofuran (THF), 1-methyl-2-pyrrolidone (NMP), dimethyl sulfoxide (DMSO), sulfolane, dioxane, chloroform, tetrachloroethane, and the like.

Examples of non-solvents that can be used in the non-solvent phase separation method include ethylene glycol, glycerin; polyethylene oxide, polypropylene oxide, alkylaryl polyether alcohols, alkylaryl sulfonates, alkyl sulfates, triethyl phosphate, formamide, acetic acid, propionic acid, 2-methoxyethanol, t-amyl alcohol, methanol, ethanol, isopropanol, hexanol, heptanol, octanol, acetone, methyl ethyl ketone, methyl isobutyl ketone, butyl ether, ethyl acetate, amyl acetate, diethylene glycol, diethylene glycol diethyl ether, diethylene glycol dibutyl ether, water, and the like.

Such solvents and/or non-solvents can be used singly or in combinations of two or more types.

For the manufacturing procedure in the non-solvent phase separation method, a chlorinated vinyl chloride resin in a weight ratio of 10 to 30%, and optionally a membrane-forming aid in a weight ratio of 5 to 30% are admixed into a solvent, and dissolved by stirring under temperature conditions up to 180° C. which does not cause thermal degradation of the chlorinated vinyl chloride resin. The solution obtained is extruded from the exterior tube-shaped nozzle having a double-tube structure using a gear pump or the like, while a non-solvent is discharged from the interior nozzle so that a hollow fiber can be formed. Moreover, a non-solvent can also be discharged from the outermost tube nozzle with a triple-tube structure, so that a hollow fiber can be formed.

Furthermore, the extruded solution and the non-solvent are passed into a non-solvent tank (coagulation tank) where the solvent/non-solvent exchange takes place, the resin component undergoes phase separation and completely precipitates to yield a hollow fiber. So that the solvent residues can be washed out of the hollow fiber membrane obtained in this way, it is preferable to carry out a water wash or the like.

It is satisfactory for the polymer membranes for water treatment of the present invention to have a porous membrane or hollow fiber morphology. It is satisfactory for the molecular weight fractionation to be 300,000 or less, preferably 150,000 or less for water treatment membranes that are referred to as ultrafiltration membrane, and more preferable is the range 10,000 to 50,000.

Furthermore, a satisfactory pure water permeability for the polymer membranes for water treatment of the present invention is 500 L/m$^2$·h·atm or more, and more preferable is 1000 L/m$^2$·h·atm or more.

Additionally, a satisfactory tensile strength is 6 MPa or more, preferably 8 MPa or more, and further preferably 10 MPa or more.

Due to having such a structure, the polymer membranes for water treatment of the present invention can be used at a maximum temperature of 90° C., and at a temperature of 60° C. for normal use without any loss of performance, and can improve the water environment by removing turbidity and contaminants from water under a broad operational range, and the like.

The membrane structure and molecular weight fractionation of the polymer membranes for water treatment can be adjusted by the appropriate choice of chlorine content of the chlorinated vinyl chloride used, its composition, the manufacturing method and conditions, and the like.

Furthermore, the polymer membranes for water treatment of the present invention do not contain any structural supporting bodies in the cross-section for increasing strength, such as nonwoven fabric, paper, fibers or the like, and it is satisfactory for the structure to be formed chiefly from chlorinated vinyl chloride resin, and preferably only from chlorinated vinyl chloride resin. In other words, by not containing any of the above-mentioned structural supporters, the membrane itself preferably comprises a single-layer structure. Here, a membrane with a single-layer structure means that it is formed from a single material. Accordingly, even though it is described above as a porous membrane and a hollow fiber membrane morphology, in cross-section it is formed as a structure without containing any of the above-mentioned structural supporters.

Usually, weak materials are strengthened through the formation of composite materials with structural supporters that are stronger materials (ceramics, nonwoven fabrics, and the like) and can be maintained in any desired shape, for example a cylinder, tube, or the like. Accordingly, so that the desired shape is not damaged during use as a water treatment membrane, in addition to the materials that form the membrane, polymer membranes for water treatment that are manufactured from conventional vinyl chloride resins, polyethylene, or the like, are associated with ceramics or nonwoven fabrics, or the like.

On the other hand, the polymer membrane for water treatment of the present invention itself is formed only from membrane with a single-layer structure using vinyl chloride resin (preferably, as mentioned above, chlorinated vinyl chloride resin with a chlorine content of 58 to 73.2%). So that the desired shape as a cylinder or the like is not deformed, it is preferable not to incorporate any structural supporters formed from materials other than vinyl chloride resin. Despite the polymer membrane for water treatment of the present invention having such a single-layer structure, it has sufficient strength to maintain its desired shape such as a cylinder, tube, or the like, during use as a water treatment membrane. In other words, it has "self-sufficiency". Accordingly, in the present invention, water treatment membrane can be realized that is different from membrane that uses other material other than vinyl chloride resin, and the polymer membrane for water treatment itself can maintain sufficient strength without any structural supporters. The result is that even when it is being backwashed, it can maintain superior water permeability without the portion of the membrane responsible for the filtration performance separating from a structural supporter, and is different from tube-shaped membrane and the like that uses structural supporter such as ceramics or the like.

Working examples of polymer membranes for water treatment and methods for their manufacture of the present invention are described in detail below.

Working Example 1

A dimethylacetamide solution containing 15 wt % of chlorinated vinyl chloride resin (HA31K; degree of chlorination: 67%; degree of polymerization: 800; Sekisui Chemical Co., Ltd.) and 15 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 2

A tetrahydrofuran solution containing 15 wt % of chlorinated vinyl chloride resin (HA31K; degree of chlorination: 67%; degree of polymerization: 800; Sekisui Chemical Co., Ltd.) and 10 wt % of polyvinylpyrrolidone K90 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 3

A dimethylacetamide solution containing 15 wt % of chlorinated vinyl chloride resin (HA58K; degree of chlorination: 68%; degree of polymerization: 1000; Sekisui Chemical Co., Ltd.) and 15 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 4

A dimethylacetamide solution containing 15 wt % of chlorinated vinyl chloride resin (HA58K; degree of chlorination: 68%; degree of polymerization: 1000; Sekisui Chemical Co., Ltd.) and 10 wt % of poly(ethylene glycol) 200 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 5

A dimethylacetamide solution containing 12 wt % of chlorinated vinyl chloride resin (HA58K; degree of chlorination: 68%; degree of polymerization: 1000; Sekisui Chemical Co., Ltd.), 3 wt % of vinyl chloride resin (TS1000R; degree of polymerization: 1000; Sekisui Chemical Co., Ltd.) and 15 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 6

An N-methyl-2-pyrrolidone solution containing 12 wt % of chlorinated vinyl chloride resin (HA58K; degree of chlorination: 68%; degree of polymerization: 1000; Sekisui Chemical Co., Ltd.), 3 wt % of vinyl chloride resin (TS1000R; degree of polymerization: 1000; Sekisui Chemical Co., Ltd.; 3 wt %) and 10 wt % of polyvinylpyrrolidone K90 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 7

A dimethylacetamide solution containing 12 wt % of chlorinated vinyl chloride resin (HA58K; degree of chlorination: 68%; degree of polymerization: 1000; Sekisui Chemical Co., Ltd.), 3 wt % of vinyl chloride resin (TS1000R; degree of polymerization: 1000; Sekisui Chemical Co., Ltd.) and 10 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 8

A dimethylacetamide solution containing 17 wt % of chlorinated vinyl chloride resin (HA05K; degree of chlorination: 67%; degree of polymerization: 500; Sekisui Chemical Co., Ltd.) and 19 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 9

An N-methyl-2-pyrrolidone solution containing 17 wt % of chlorinated vinyl chloride resin (HA05K; degree of chlorination: 67%; degree of polymerization: 500; Sekisui Chemical Co., Ltd.) and 10 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 10

A tetrahydrofuran solution containing 28 wt % of chlorinated vinyl chloride resin (HA05K; degree of chlorination: 67%; degree of polymerization: 500; Sekisui Chemical Co., Ltd.) and 10 wt % of polyvinylpyrrolidone K90 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 11

A dimethylacetamide solution containing 30 wt % of chlorinated vinyl chloride resin (HA05K; degree of chlorination: 67%; degree of polymerization: 500; Sekisui Chemical Co., Ltd.) and 15 wt % of poly(ethylene glycol) 200 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 12

A dimethylacetamide solution containing 17 wt % of chlorinated vinyl chloride resin (HA31K; degree of chlorination: 67%; degree of polymerization: 800; Sekisui Chemical Co., Ltd.) and 20 wt % of poly(ethylene glycol) 400 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 13

A dimethylacetamide solution containing 17 wt % of chlorinated vinyl chloride resin (HA31K; degree of chlorination: 67%; degree of polymerization: 800; Sekisui Chemical Co., Ltd.) and 10 wt % of poly(ethylene glycol) 400 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 14

A tetrahydrofuran solution containing 25 wt % of chlorinated vinyl chloride resin (HA31K; degree of chlorination: 67%; degree of polymerization: 800; Sekisui Chemical Co., Ltd.) and 20 wt % of polyvinylpyrrolidone K90 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 15

A dimethylacetamide solution containing 17 wt % of chlorinated vinyl chloride resin (HA31K; degree of chlorination: 67%; degree of polymerization: 800; Sekisui Chemical Co., Ltd.) and 10 wt % of poly(ethylene glycol) 400 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 16

A dimethylacetamide/tetrahydrofuran (9:1) mixed solution containing 20 wt % of chlorinated vinyl chloride resin (HA31N; degree of chlorination: 70%; degree of polymerization: 800; Sekisui Chemical Co., Ltd.) and 10 wt % of polyvinylpyrrolidone K90 (10 wt %) was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 17

A tetrahydrofuran solution containing 20 wt % of chlorinated vinyl chloride resin (HA31K; degree of chlorination: 67%; degree of polymerization: 800; Sekisui Chemical Co., Ltd.) and 10 wt % of polyvinylpyrrolidone K90 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 18

A tetrahydrofuran solution containing 20 wt % of chlorinated vinyl chloride resin (HA15E; degree of chlorination: 62%; degree of polymerization: 600; Sekisui Chemical Co., Ltd.) and 10 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Working Example 19

A tetrahydrofuran solution containing 20 wt % of chlorinated vinyl chloride resin (HA15E; degree of chlorination: 62%; degree of polymerization: 600; Sekisui Chemical Co., Ltd.) and 10 wt % of polyvinylpyrrolidone K90 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Comparative Example 1

A dimethylacetamide solution containing 15 wt % of vinyl chloride resin (TS1000R; degree of polymerization: 1000; Sekisui Chemical Co., Ltd.) and 15 wt % of poly(ethylene glycol) 4000 (15 wt %) was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Comparative Example 2

A tetrahydrofuran solution containing 20 wt % of vinyl chloride resin (TS800E; degree of polymerization: 800; Sekisui Chemical Co., Ltd.) and 10 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Comparative Example 3

A dimethylacetamide solution containing 15 wt % of vinyl chloride/vinyl acetate copolymer resin (VYNS-3; vinyl chloride (90 wt %)/vinyl acetate (10 wt %); Dow Chemical Co.) and 15 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Comparative Example 4

A vinyl chloride/vinyl acetate/maleic anhydride copolymer resin (vinyl chloride (70 wt %)/vinyl acetate (10 wt %)/maleic anhydride (20 wt %) copolymer) was synthesized. A dimethylacetamide solution containing 5 wt % of this resin, 11.5 wt % of vinyl chloride resin (TS1000R; degree of polymerization: 1000; Sekisui Chemical Co., Ltd.) and 7 wt % of poly(ethylene glycol) 4000 was continuously discharged from a hollow fiber nozzle, and a porous hollow fiber membrane was obtained through phase separation in a water bath. The hollow fiber membrane obtained had an outer diameter of 1.2 mm and an inner diameter of 0.8 mm.

Evaluations

The pure water permeability (units: L/m²·h·atm) of the hollow fiber membranes obtained from the working examples and the comparative examples of polymer membranes for water treatment was measured using an internal pressure test at a transmembrane pressure difference of 50 kPa.

In addition, tensile strength testing (units: MPa) was conducted using a Shimadzu autoclave with a testing speed: 100 mm/min; clamp distance: 50 mm; humidity: 50%; and, temperature: 23° C.

These results are shown in Table 1.

Furthermore, the water permeability was remeasured on a portion of the sample after immersion in hot water at 90° C. for 6 h. These results are shown in Table 2.

Furthermore, a filtration test using y-globulin was conducted with each polymer membrane for water treatment to confirm that the molecular weight fractionation was approximately 150,000 or less.

TABLE 1

|  | Strength | Water permeability |
|---|---|---|
| Ex. | | |
| Ex. 1 | 6.2 | 700 |
| Ex. 2 | 6.4 | 700 |
| Ex. 3 | 6.8 | 700 |
| Ex. 4 | 7.0 | 700 |
| Ex. 5 | 6.4 | 650 |
| Ex. 6 | 6.6 | 650 |
| Ex. 7 | 6.6 | 650 |
| Ex. 8 | 7.2 | 850 |
| Ex. 9 | 7.2 | 800 |
| Ex. 10 | 12.0 | 620 |
| Ex. 11 | 14.0 | 580 |
| Ex. 12 | 7.2 | 1000 |
| Ex. 13 | 7.5 | 1000 |
| Ex. 14 | 12.8 | 570 |
| Ex. 15 | 12.6 | 550 |
| Ex. 16 | 11.2 | 700 |
| Ex. 17 | 11.2 | 670 |
| Ex. 18 | 7.2 | 600 |
| Ex. 19 | 7.8 | 550 |
| Comp. Ex. | | |
| Comp. Ex. 1 | 3.8 | 300 |
| Comp. Ex. 2 | 3.2 | 400 |
| Comp. Ex. 3 | 2.4 | 450 |
| Comp. Ex. 4 | 2.4 | 550 |

TABLE 2

| | Pure Water Permeability (L/m²·hr·atm) | |
|---|---|---|
| | Before immersion in hot water | After immersion in hot water |
| Ex. 1 | 700 | 650 |
| Ex. 3 | 700 | 680 |
| Ex. 5 | 650 | 450 |
| Ex. 8 | 850 | 800 |
| Ex. 12 | 1000 | 920 |
| Comp. Ex. 1 | 300 | 50 |
| Comp. Ex. 3 | 450 | 20 |
| Comp. Ex. 4 | 550 | 30 |

As is clear from Tables 1 and 2, polymer membranes for water treatment of the working examples can be manufactured by extremely simple methods that employ a vinyl chloride resin with a relatively high chlorine content as the raw material. In addition, they were confirmed to exhibit higher strength and water permeability as compared to the comparative examples. Furthermore, due to the properties of chlorinated vinyl chloride resin itself, high heat resistance can be realized.

In other words, while having high strength, the polymer membranes for water treatment of the present invention have practical durability, and also have capabilities such as water permeability, heat resistance, chemical resistance, flexibility and the like, and can be used under a wide range of conditions.

INDUSTRIAL APPLICABILITY

The polymer membranes for water treatment for water treatment of the present invention are extremely useful separation membranes for removing turbidity from river water and groundwater, clarification of industrial water, and for the treatment of wastewater and sewage, and can be suitable for use in water treatment units and as commercial water treatment membranes.

The invention claimed is:

1. A polymer membrane for water treatment being single-layer structure of a chlorinated vinyl chloride resin with a chlorine content of 58 to 73.2% and being an ultrafiltration membrane with 150,000 or less of the molecular weight fractionation.

2. A polymer membrane for water treatment being single-layer structure of a chlorinated vinyl chloride resin with a chlorine content of 58 to 73.2% and being an ultrafiltration membrane with 500 to 1000 $L/m^2/h/atm$ of the pure water permeability.

3. A polymer membrane for water treatment formed from single-layer structure membrane containing a chlorinated vinyl chloride resin with a chlorine content of 58 to 73.2% and being an ultrafiltration membrane with 500 to 1000 $L/m^2/h/atm$ of the pure water permeability.

4. The polymer membrane for water treatment of claim 1, wherein
the degree of polymerization for the chlorinated vinyl chloride resins is 250 to 3000.

5. The polymer membrane for water treatment of claim 1, wherein
the chlorinated vinyl chloride resin is contained 30 to 100 wt % based on all of the resin components that constitute the polymer membrane for water treatment.

6. The polymer membrane for water treatment of claim 1, wherein
a chlorinated vinyl chloride monomer unit that constitute a main chain is contained 30 to 100 wt % based on all of the monomer units that constitute the main chain.

7. The polymer membrane for water treatment of claim 1 being a hollow fiber.

8. The polymer membrane for water treatment of claim 2, wherein
the degree of polymerization for the chlorinated vinyl chloride resins is 250 to 3000.

9. The polymer membrane for water treatment of claim 2, wherein
the chlorinated vinyl chloride resin is contained 30 to 100 wt % based on all of the resin components that constitute the polymer membrane for water treatment.

10. The polymer membrane for water treatment of claim 2, wherein
a chlorinated vinyl chloride monomer unit that constitute a main chain is contained 30 to 100 wt % based on all of the monomer units that constitute the main chain.

11. The polymer membrane for water treatment of claim 2 being a hollow fiber.

12. The polymer membrane for water treatment of claim 3, wherein
the degree of polymerization for the chlorinated vinyl chloride resins is 250 to 3000.

13. The polymer membrane for water treatment of claim 3, wherein
the chlorinated vinyl chloride resin is contained 30 to 100 wt % based on all of the resin components that constitute the polymer membrane for water treatment.

14. The polymer membrane for water treatment of claim 3, wherein
a chlorinated vinyl chloride monomer unit that constitute a main chain is contained 30 to 100 wt % based on all of the monomer units that constitute the main chain.

15. The polymer membrane for water treatment of claim 3 being a hollow fiber.

* * * * *